United States Patent [19]

Weinberg et al.

[11] Patent Number: 5,060,039

[45] Date of Patent: Oct. 22, 1991

[54] PERMANENT MAGNET FORCE REBALANCE MICRO ACCELEROMETER

[75] Inventors: Marc S. Weinberg, Needham; Paul Greiff, Wayland, both of Mass.

[73] Assignee: The Charles Stark Draper Laboratory, Inc., Cambridge, Mass.

[21] Appl. No.: 314,453

[22] Filed: Feb. 22, 1989

Related U.S. Application Data

[63] Continuation-in-part of Ser. No. 143,515, Jan. 13, 1988, abandoned.

[51] Int. Cl.$^5$ .................. H01L 29/84; H01L 27/22; G01P 15/08; G01P 15/00
[52] U.S. Cl. .................................. 357/26; 357/27; 73/517 R; 73/505
[58] Field of Search .................. 357/26, 27; 73/503, 73/505, 517 B, 517 R

[56] References Cited

U.S. PATENT DOCUMENTS

| | | | |
|---|---|---|---|
| 4,483,194 | 11/1984 | Rudolf | 73/517 R |
| 4,670,092 | 6/1987 | Motamedi | 357/26 |
| 4,711,128 | 12/1987 | Boura | 73/517 B |

FOREIGN PATENT DOCUMENTS 2833915  4/1979  Fed. Rep. of Germany .... 73/517 B

OTHER PUBLICATIONS

"A Monolithic Capacitive Pressure Sensor with Pulse-Period Output", Sanders et al., IEEE Transactions on Electron Devices, vol. ED-27, #5, May 1980, pp. 927-930.

"An Ultra Miniature Solid-State Pressure Sensor for a Cardiovascular Catheter", Chau et al., IEEE Transactions on Electron Devices, vol. ED-35, #15, Dec. 1988, pp. 2355-2361.

*Primary Examiner*—Rolf Hille
*Assistant Examiner*—Wael Fahmy
*Attorney, Agent, or Firm*—Weingarten, Schurgin, Gagnebin & Hayes

[57] ABSTRACT

An accelerometer fabricated by micromachining techniques from a crystaline precursor. The accelerometer is formed in a body of a semiconductor crystal such as silicon by doping portions to an etch resistant condition and etching a cavity around them to release a resiliently suspended multi legged member. A conductor is formed in one of the legs. A permanent magnet is placed with opposite polarity poles on either side of the leg and the acceleration displacement of the member sensed from which a current is developed through the leg conductor to restore the member position and provide an output indication of acceleration.

11 Claims, 6 Drawing Sheets

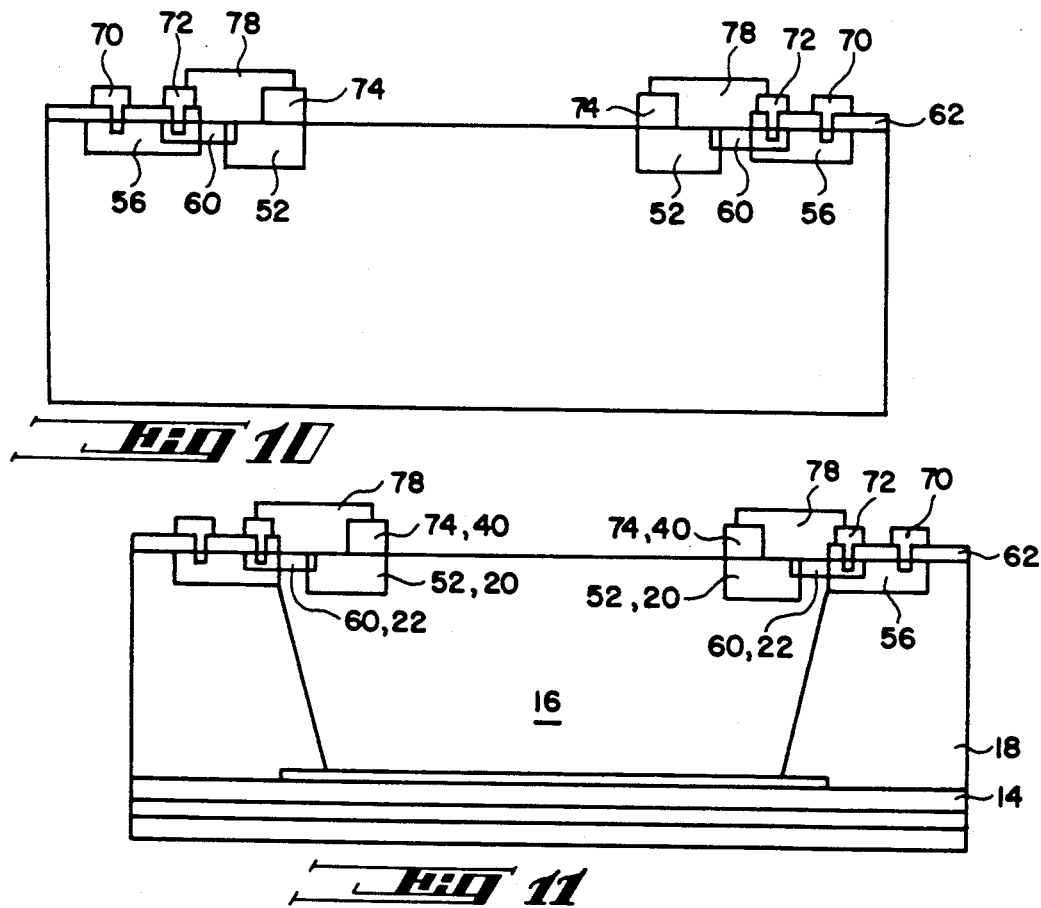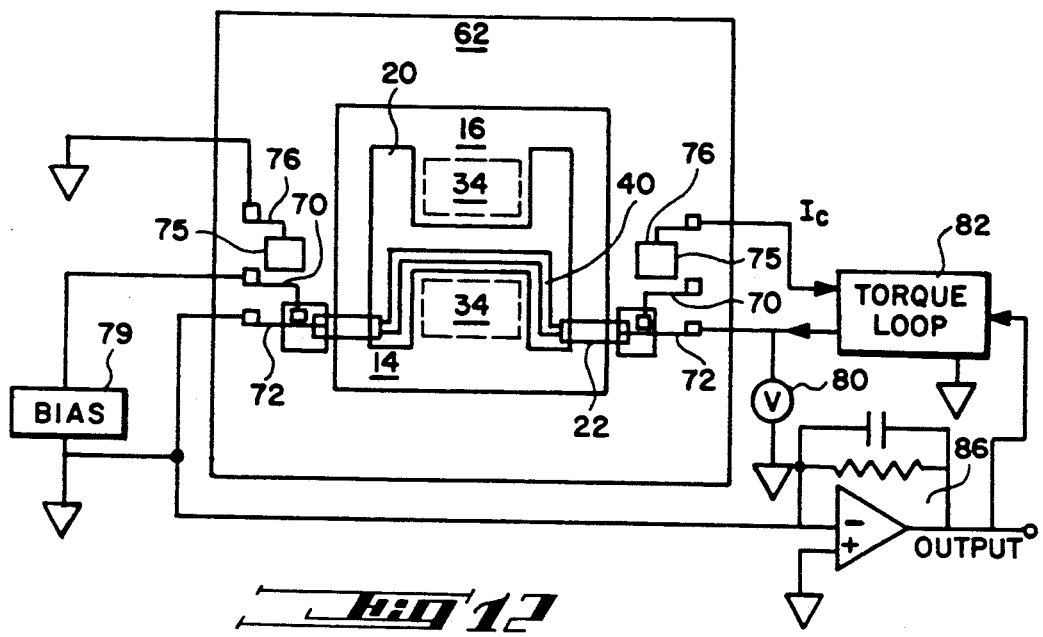

PERMANENT MAGNET FORCE REBALANCE MICRO ACCELEROMETER

CROSS REFERENCE

The present application is a continuation-in-part of commonly assigned U.S. patent application Ser. No. 143,515, filed Jan. 13, 1988 now abandoned.

FIELD AND BACKGROUND

The present invention relates to accelerometers. Such inertial sensors have typically been the province of the heavy, bulky and expensive electromechanical devices which have found applications in inertial navigation systems. With the increase of applications for automation systems such as robotic positioners and sensors, the need arises for accelerometers to form an integral component of robotic manipulator sensors. In other areas accelerometers can find application in moving systems such as vehicles of all types. Many of these applications need only short term accuracy and can tolerate lower long term accuracy and stability than conventional inertial sensors can provide.

The conventional electromechanical acceleration sensors are far too costly to accomodate the needs for a multiplicity of acceleration sensors in present day applications. At the same time the bulk of the conventional acceleration sensors makes their use on small robotic or motive systems inappropriate.

BRIEF SUMMARY

According to the teaching of the present invention, an acceleration sensor is micromachined from a minute body of silicon or other semiconductor or crystalline precursor. The accelerometer comprises a body of silicon having an etched cavity in which a doped and thus etch resistant mass member is resiliently supported as a result of etching the body around the member. The doped member has a pair of support flexures along an axis about which it can resiliently flex by rotating or bending. The member has a deposition formed conductor extending over a portion of it over and between the flexures. A length of the conductor extends parallel to but displaced from the axis of flexing.

A set of opposite poles from a permanent magnet are positioned either side of the leg. The displacement of the member is capacitively sensed by the variation in the gap between the member and the bottom of the etched cavity and a current is applied through the conductor of a direction to restore the member to a neutral position. The current through the conductor is a measure of the acceleration experienced by the member.

DESCRIPTION OF THE DRAWING

These and other features of the present invention are more fully set forth below in the detailed description and accompanying drawing of which:

FIGS. 2–11 are sectional views through a semiconductor body at various stages in manufacture of the resiliently suspended member of the accelerometer of the present invention;

FIG. 12 is a top view of a completed substrate; and

DETAILED DESCRIPTION OF THE INVENTION

The present invention contemplates an accelerometer fabricated by micro machining techniques applied to a block of semiconductor precursor material to produce a resiliently supported mass member within a body cavity having a portion with an electrical conductor thereacross and a permanent magnet with pole faces positioned either side of the portion. A torque loop is closed to apply current through the conductor as a function of accelerometer displacement as sensed by capacitive variations between the resiliently supported member and the cavity bottom in order to restore the resiliently supported member to a neutral position.

Figure 1:
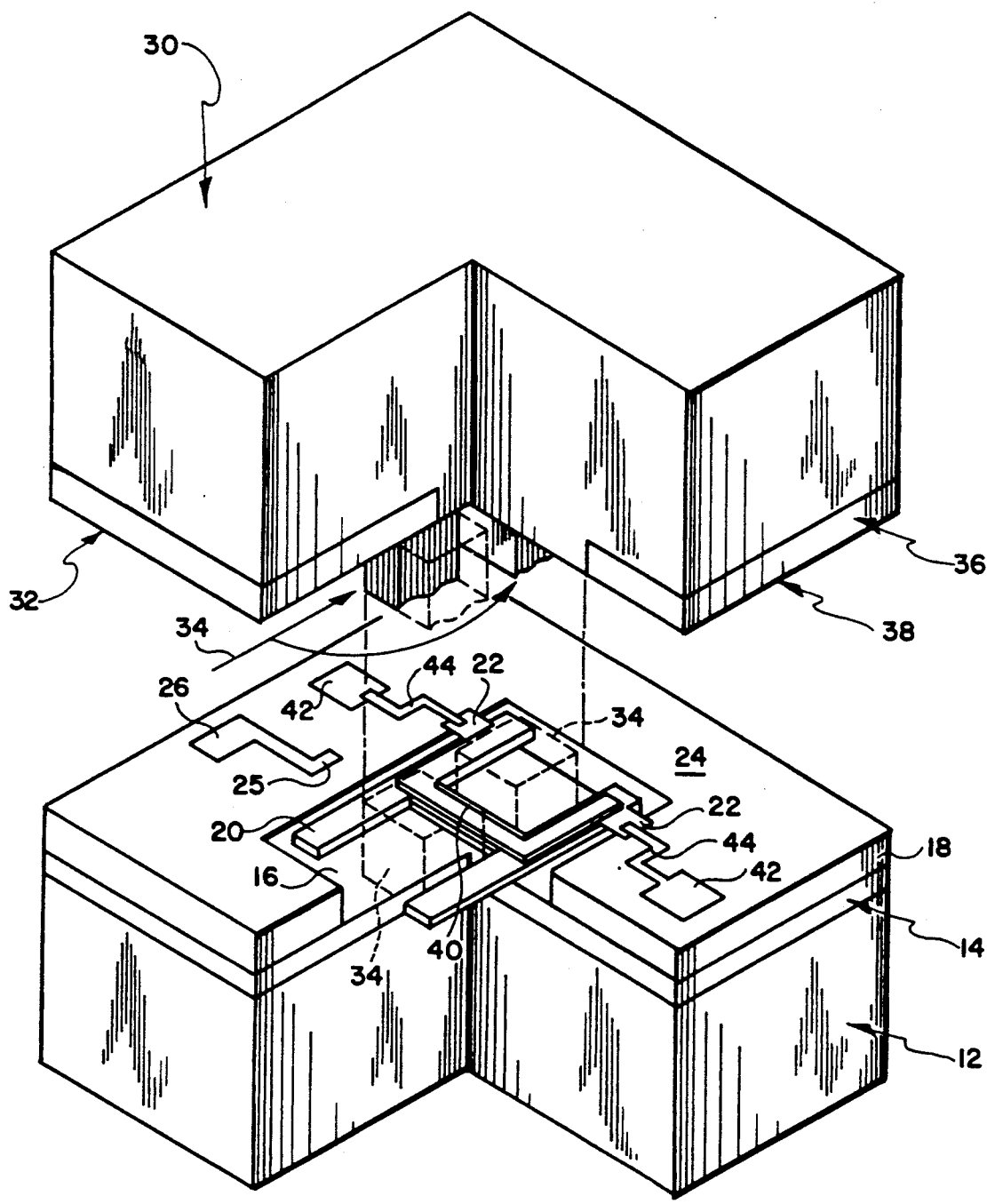
FIG. 1 is an exploded view of a completed accelerometer according to the present invention.
Figure 2:
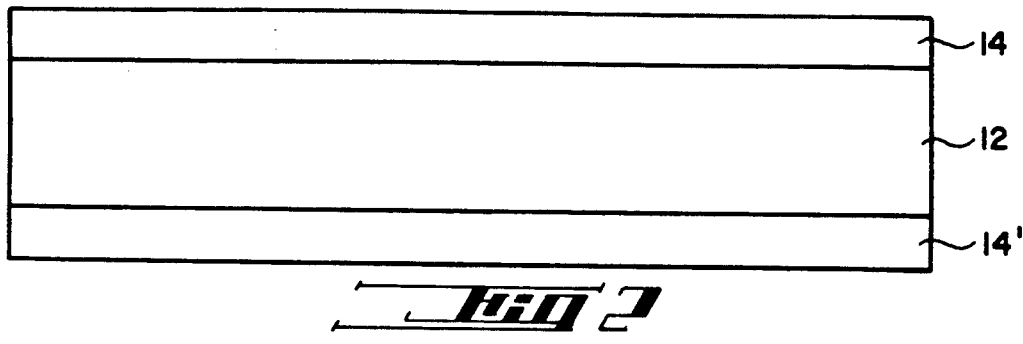

An exploded pictorial view of an accelerometer exemplary of the invention is illustrated with respect to FIG. 1. As shown there a semiconductor body 12, such as mono or poly crystalline silicon has a diffusion layer 14 therein, such as a highly doped boron layer, which forms both an etch stop and the conductive bottom of a cavity 16 over which the acceleration sensitive mass is supported. On top of the doped layer 14 an epitaxial "P" type layer 18 is grown and subsequently etched to form the cavity 16.

A resiliently supported acceleration sensitive member 20, in this example in the configuration of an "H", has flexures 22 joining it to the epitaxial layer 18. The acceleration sensitive member 20 and the flexures 22 are etch resistant, doped silicon permitting those structures to be released by etching, through a dielectric surface 24 apertured in the location of the cavity 16, into the epitaxial layer 18 as illustrated.

A substrate 30, typically transparent, has extended downwardly from a bottom surface 32 a pair of permanent magnet poles 34. A nickel or iron surface 36 on the bottom of the substrate 30, capped with a silicon dioxide layer 38, provides a magnetic return path for flux passing between the poles 34. The substrate 30, in the completed unit, is positioned with the poles 34 on either side of the central crosspiece of the resiliently supported acceleration sensitive member 20. An electrical conductor 40 is plated across the member 20 and in particular the central crosspiece spanned by the poles 34. Contacts to the conductor 40 are applied through contact paths 42 and corresponding metallizations 44 which contact the conductive, doped flexures 22 and in turn the metallization conductor 40. As will be described below with respect to the completed instrument, current can be applied through the conductor 40 to interact with the magnetic field between the poles 34 to cause the resiliently supported member to rotate about an axis through the flexures 22. Current through the conductor 40 is developed by sensing the capacitance between the member 20 and the etch resistant doped layer 14 at the bottom of the cavity 16 and developing a feedback control current that restores the position of this resiliently supported acceleration sensitive member 20 to a nominal position. The current required for restoration then provides an indication of sensed acceleration. The magnetic field could be provided by a source outside the FIG. 1 package where desired.

Figure 3:
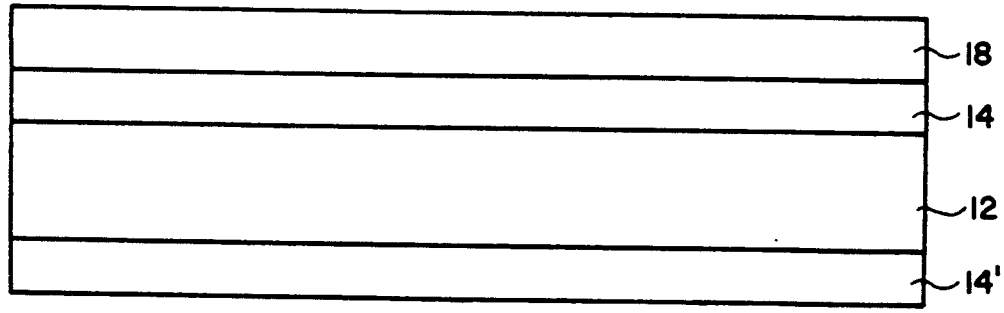
Figure 4:
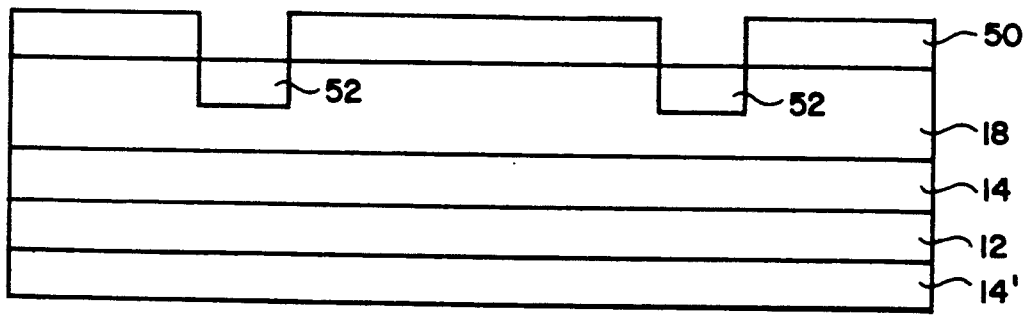

The fabrication of the acceleration sensitive portion built onto the substrate 12 is illustrated with respect to FIGS. 2–11 representing cross-sectional views through the substrate 12 and corresponding top surface views of FIGS. 6A, 7A, 9A and 10A. With respect first to FIG. 2 there is illustrated the substrate 12 which may be slightly boron doped to form a "P" semiconductor material. On the top and bottom of the substrate 12 high boron concentration diffusions are provided for etch resistant layers 14 and 14'. The substrate 12 typically has the top surface with the <100> surface orientation with a flat on the <110> orientation. As illustrated in FIG. 3 an epitaxial "P" type layer 18 is grown on top of the doped layer 14. In FIG. 4 an apertured oxide layer 50 is applied over the epitaxial layer 18. The apertures are formed and a subsequent diffusion produces a diffusion pattern 52 corresponding to the resiliently supported, "H" shaped acceleration sensitive member 20. The apertured oxide layer 50 is typically produced by forming an unapertured oxide layer at 50, followed by an unapertured photo resist layer on top of it. The photoresist is apertured in the pattern of diffusion pattern 52, and the oxide removed in that pattern, exposing the silicon where diffusion is to occur. The photoresist is then eliminated and a diffusion environment established to produce pattern 52.

Figure 5:
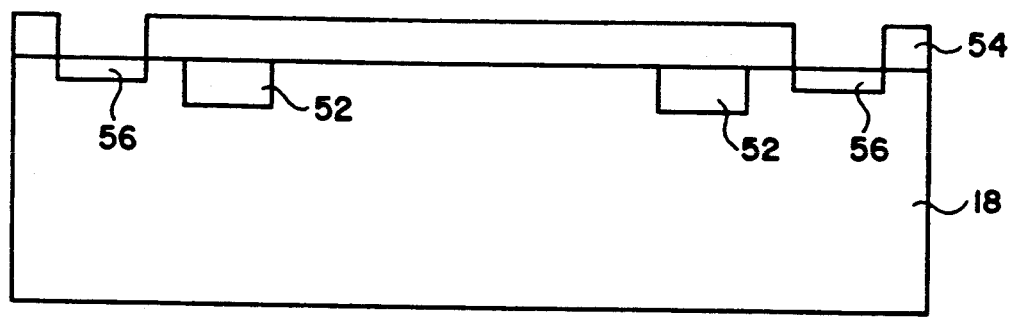
Figure 6:
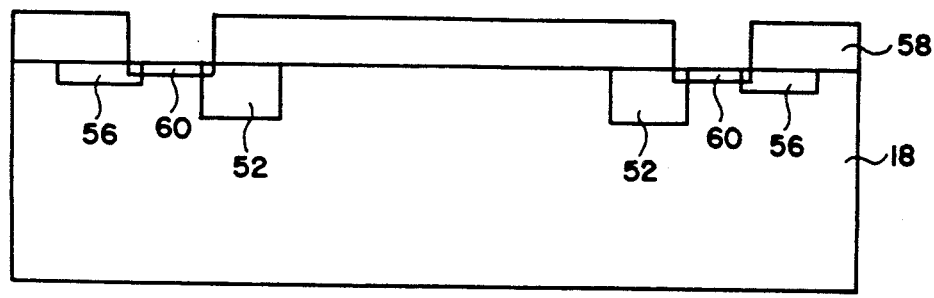
Figure 6A:
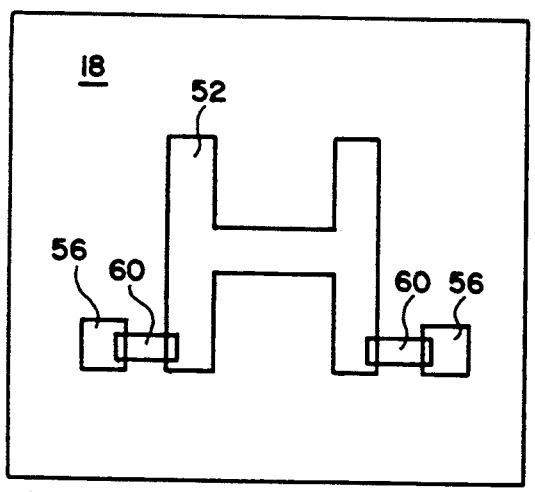
FIGS. 6A, 7A, 9A and 10A are top views of the semiconductor body at corresponding stages of manufacture.

In FIG. 5, using similar techniques, a further apertured oxide layer 54 is provided over the epitaxial layer 18 and a shallow phosphorus, "N" typed diffusion 56 provided which will achieve an isolation of the layer 52 when etched to form the acceleration sensitive member 20. In subsequent processing as illustrated in FIG. 6 a yet further oxide layer 58 is provided and apertured to permit diffusion of a shallow boron "P" type layer 60 which will form the flexures 22 illustrated in FIG. 1. FIG. 6A illustrates from a top view the positioning of the respective diffusion layers 52, 56 and 60.

Figure 7:
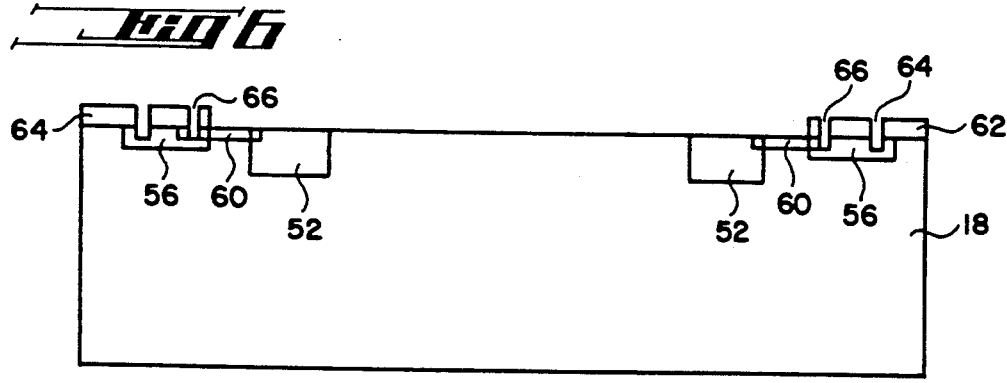
Figure 7A:
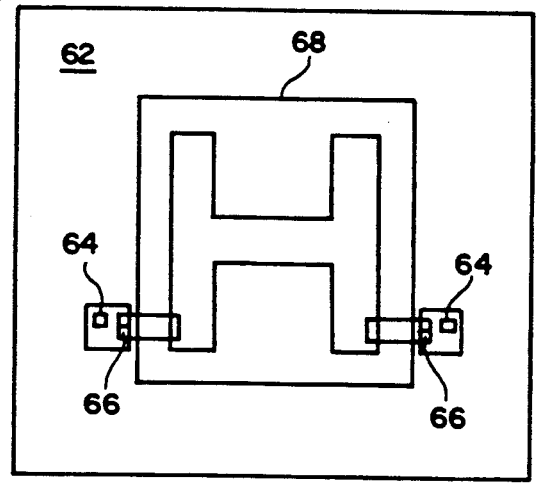

In FIG. 7 a silicon dioxide or other insulating layer 62 is regrown over the surface of the substrate and apertured in locations 64 and 66 to permit metallization contacts to the diffusion regions 56 and 60 respectively and to leave a central aperture 68 which will define etch stop regions for the final etching of the completed unit. FIG. 7A illustrates a top view of the processing at this point.

Figure 8:
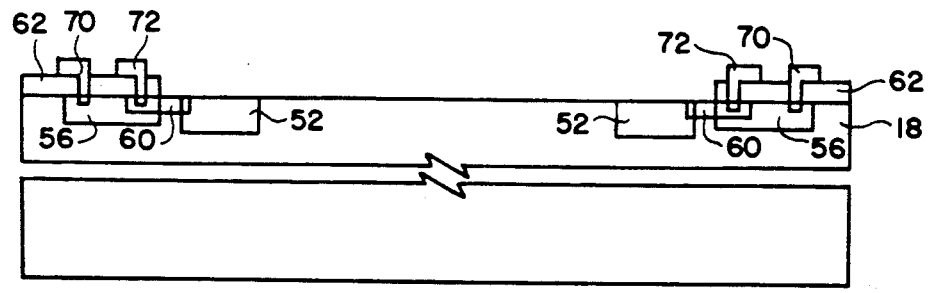
Figure 9:
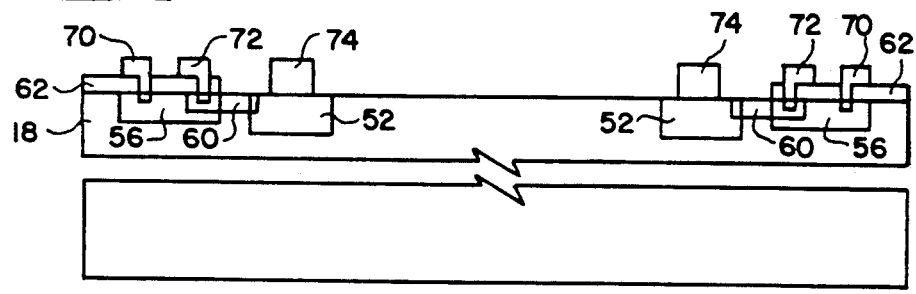
Figure 9A:
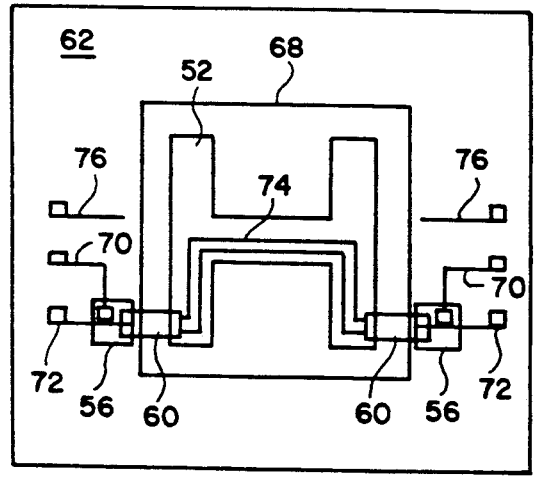

In FIG. 8 metallization regions 70 and 72 are applied over the dielectric layer 62 to contact the layers 56 and 60 through respective apertures 64 and 66. In FIG. 9 a metallization 74 is applied (through a resist mask not shown) over the diffusion region 52 to provide the electrical conductor 40 illustrated in FIG. 1. The resulting surface pattern is illustrated in FIG. 9. An additional metallization 76 is provided which is applied through apertures 75 in the dielectric layer 62 to contact the "P" body of epitaxial layer 18, in turn contacting layer 14.

Figure 10A:
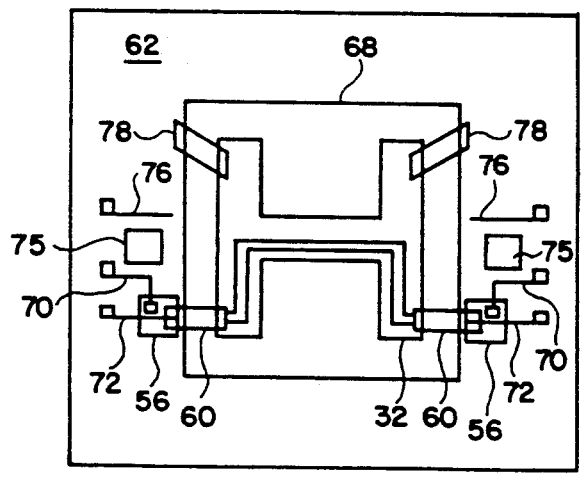

In FIG. 10 a further metallization 78 is provided which, for temporary restraint, bonds the diffusion region 52 to the dielectric layer 62. This prevents the diffusion layer 52 when it is etched free to form the resiliently supported member 20, from moving during final fabrication processes. The surface view of the substrate at this stage of processing is illustrated in FIG. 10A. An alternative temporary restraint is achieved by forming a silicon bridge between the supported member 52 and layer 18. This is produced by creating an aperture in the overlying oxide 58 in the region where metalization 78 would occur during the photolithography for region 60. During the subsequent "P" type diffusion to create etch resistant region 60 an etch resistant silicon bridge will also be created in the region 78. This bridge will remain in place like flexure 60, but after the accelerometer has been fully packaged the supported member 52 is released by laser cutting of that bridge in region 78.

In FIG. 11, the final processing stage is illustrated in which the epitaxial layer 18 is anisotropically etched through the aperture 68 to produce the cavity 16 illustrated in FIG. 1. The etching proceeds until it reaches the etch stop layer 14 and the crystal orientation created etch stop sides. The layer 14 provides the bottom of the cavity and one plate for capacitive sensing of the distance between the bottom of the cavity 16 and the supported member 52. Contact to the layer 14 is provided through the metallization 76 and aperture 75. Optionally, during the diffusion steps, a diffusion of "P" type material may be provided to the epitaxial layer 18 to provide a surface ohmic contact to the layer 14. Alternatively layer 14 may be contacted via ohmic contact to the bottom of the bottom layer 14'.

By reference to FIG. 12, the electronics associated with the completed structure to provide accelerometer operation is illustrated. The ohmic contacts 70 are biased by bias source 79 to provide a reverse biased "PN" junction between the flexures 22 and the remainder of the epitaxial layer 18 which permits the contacts 72 and the proof mass 52 to be electrically isolated from the layer 18. A high frequency (100 kHz) voltage source 80 is applied to contact pad 72 which is resistively connected to movable element 20 via flexures 22. The cavity bottom 16 is coupled capacitively to the member 20 and resistively to the metalization 76. Torque rebalance loop electronics 82, as known in the art, sense the high frequency current Ic, between the contacts 76 and 72, representative of capacitance and, thus, position of the member 20 relative to the bottom of the cavity 16. Passed through appropriate compensation networks, this current is used to generate a rebalance current in electronics 82 which is applied through conductor 40 on member 20. Typically, the sensing of capacitance will be at one high frequency while the rebalance loop current will be at a DC level which prevents interference of the capacitive sensing function from the loop rebalance current driven through the conductor 40 (and also through the element 20 which is electrically parallel to 40). The current through conductor 40 is applied to a virtual ground at amplifier 86. Amplifier 86 provides an output indication of current and, thus, acceleration. Amplifier 86 also filters out the high frequency signal which drives the capacitor position sensor in its feedback loop.

Alternatively, the high frequency voltage can be applied to pad 76. At the pads 72, frequency separation in loop 82 can then be used to separate the low frequency rebalance current from the high frequency current Ic, proportional to the relative position between the cavity bottom 16 and the movable element 20.

Final IC packaging of the accelerometer with the substrate 30 bonded above the substrate 12 produces a small and inexpensively produced acceleration sensor for modern robotic or other motive system applications.

Figure 13:
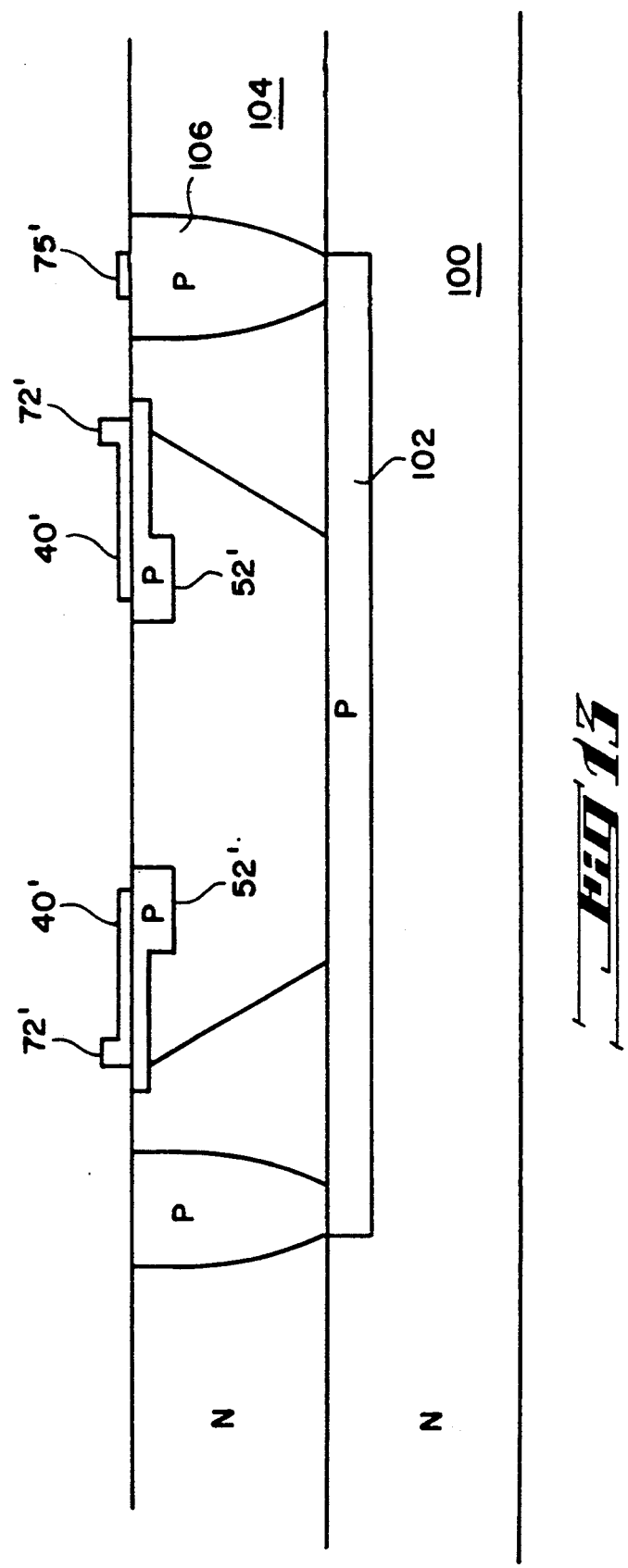
FIG. 13 is a sectional view illustrating a modification in the steps of FIGS. 2–11.

FIG. 13 illustrates a version in which the epitaxially grown layer is "N" doped rather than "P" doped. As shown in FIG. 13, on a substrate 100 of typically "N" type material a diffusion 102 of a "P" type, boron, is provided to establish the electrode(s) below the supported mass. Above the thus diffused substrate 100 an epitaxial layer 104 of "N" type semiconductor is grown. Contacts through the layer 104 to the buried diffusion layer 102 are provided through a deep diffusion 106.

In other respects the structure of FIG. 13, labeled with primes, corresponds to the structure of FIGS. 2-11. The use of an "N" type epitaxial layer 104 avoids the necessity for the provision of the back biased diode isolating region 56, however, the interconnected "N" layers of FIG. 13 must be reversed biased with respect to the "P" layers to achieve electrical isolation.

The above described sensor is intended to be exemplary of an accelerometer according to the present invention. In addition to other modifications and variations, it should be noted that the shape for the resiliently supported member 20 may be other than that as shown, including "U" shaped. Also, the flexures 20 may be replaced by cantilevers which provide restraint according to beam bending flexure elasticity as opposed to torsional elasticity. Accordingly, it is intended to define the scope of the invention solely in accordance with the following claims.

We claim:

1. A micromachined monolithic structure adapted for use in inertial acceleration sensing comprising:
    a monolithic body of an etchable structural material and having an etched cavity with a bottom therein;
    said monolithic body including a resiliently supported element suspended in said cavity above said bottom and having attachments to said body forming resilient supports for said element which permits said element to rotate about a first axis which passes through said supports;
    said resiliently supported element including an opening between first and second segments coupled to said resilient supports, said first and second segments of said resiliently supported element coupled by a crosspiece extending parallel to and laterally displaced from said first axis;
    said element and supports having etch resistant dopants therein, and formed in the same structural material as said monolithic body by selectively etching portions of said body;
    an electrical conductor extending in a direction parallel to said axis across a portion of a surface of said crosspiece of said element;
    a permanent magnet including first and second pole portions disposed on either side of said crosspiece of said element, said first and second pole portions supported to direct magnetic field lines orthogonal to the direction of said conductor where it crosses a portion of said surface of said crosspiece of said element such that rotation of said crosspiece of said element about said axis will cause said conductor to pass through a maximum of magnetic field lines from said permanent magnet; and
    means for imparting electrical conductivity to said bottom of said body.

2. The structure of claim 1 wherein said structural material is a crystalline material.

3. The structure of claim 2 wherein said structural material is silicon.

4. The structure of claim 3 wherein said structural material is epitaxial silicon grown over a doped silicon substrate.

5. The structure of claim 4 wherein said substrate forms said cavity bottom.

6. The structure of claim 1 wherein said element is a semiconductor material.

7. The structure of claim 4 wherein said epitaxial silicon has the <100> crystal orientation parallel to said element surface.

8. The structure of claim 6 wherein said element is doped silicon.

9. The structure of claim 8 wherein said supports are doped silicon.

10. The structure of claim 1 further including:
    means for sensing capacitance between said element and said bottom as an indication of acceleration applied to said element; and
    means for applying current through said conductor to torque said element about said axis so as to restore said element to a nominal position.

11. The structure of claim 10 further including means for sensing current through said conductor as an indication of acceleration on said element.

* * * * *